(12) United States Patent
Yang et al.

(10) Patent No.: US 11,987,320 B2
(45) Date of Patent: May 21, 2024

(54) POWER ASSISTED ELECTRIC BICYCLE, TRANSMISSION DEVICE AND CONTROL METHOD

(71) Applicant: Gogoro Inc., Hong Kong (CN)

(72) Inventors: Neng-Jie Yang, Taoyuan (TW); Ying-Che Shih, Taoyuan (TW); Sung-Ching Lin, Taoyuan (TW)

(73) Assignee: Gogoro Inc., Hong Kong (CN)

( * ) Notice: Subject to any disclaimer, the term of this patent is extended or adjusted under 35 U.S.C. 154(b) by 881 days.

(21) Appl. No.: 17/078,951

(22) Filed: Oct. 23, 2020

(65) Prior Publication Data

US 2021/0122444 A1    Apr. 29, 2021

(30) Foreign Application Priority Data

Oct. 24, 2019 (TW) .................................. 108138465

(51) Int. Cl.
*B62M 6/50* (2010.01)
*B62M 6/65* (2010.01)

(52) U.S. Cl.
CPC ................ *B62M 6/50* (2013.01); *B62M 6/65* (2013.01)

(58) Field of Classification Search
CPC .................................. B62M 6/50; B62M 6/65
See application file for complete search history.

(56) References Cited

U.S. PATENT DOCUMENTS 10,336,402 B2 * 7/2019 Repoulias ............ B60L 15/2054
2004/0206563 A1 10/2004 Murata 2014/0166386 A1    6/2014  Arimune et al.
2017/0151998 A1 *  6/2017  Negoro ..................... B62M 6/55
2019/0263472 A1    8/2019  Kimpara et al.
2019/0299797 A1   10/2019  Hasumi
2022/0242521 A1 *  8/2022  Kimpara .................. B62M 6/55

FOREIGN PATENT DOCUMENTS

| CN | 103863506 A  | 6/2014 |
| CN | 109941390 A  | 6/2019 |
| JP | 2000168672 A | 6/2000 |

(Continued)

OTHER PUBLICATIONS

Taiwanese Office Action received for copending Taiwanese Patent Application No. TW108138465; Applicant; Gogoro Inc.; Date of Mailing: Sep. 10, 2020, 10 pages.

(Continued)

*Primary Examiner* — Tony H Winner
(74) *Attorney, Agent, or Firm* — Perkins Coie LLP

(57) ABSTRACT

The present disclosure provides a power assisted electric bicycle, a transmission device and a control method. The power assisted electric bicycle includes a body, a wheel, a torque sensor, a motor and a controller. The torque sensor is configured to output a plurality of torque signals corresponding to a pedal force. The controller is configured to: receive the torque signals from the torque sensor; compute and determine a first period according to a speed of the power assisted electric bicycle at a first time point; obtain a first maximum value of the torque signals in the first period that ends at the first time point; and, set a first torque output of the motor according to the first maximum value corresponding to the torque signal.

20 Claims, 13 Drawing Sheets

(56) References Cited

FOREIGN PATENT DOCUMENTS

| | | |
|---|---|---|
| JP | 2007230411 A | 9/2007 |
| TW | 1375637 B | 11/2012 |

OTHER PUBLICATIONS

European search report issued for copending EP Application No. EP20203661.2, Applicant: Gogoro Inc., Date of Mailing: Mar. 12, 2021, 4 pages.

Chinese office action issued for copending CN Application No. CN201911016255.6, Applicant: Gogoro Inc., Date of Mailing: Nov. 17, 2021, 12 pages.

\* cited by examiner

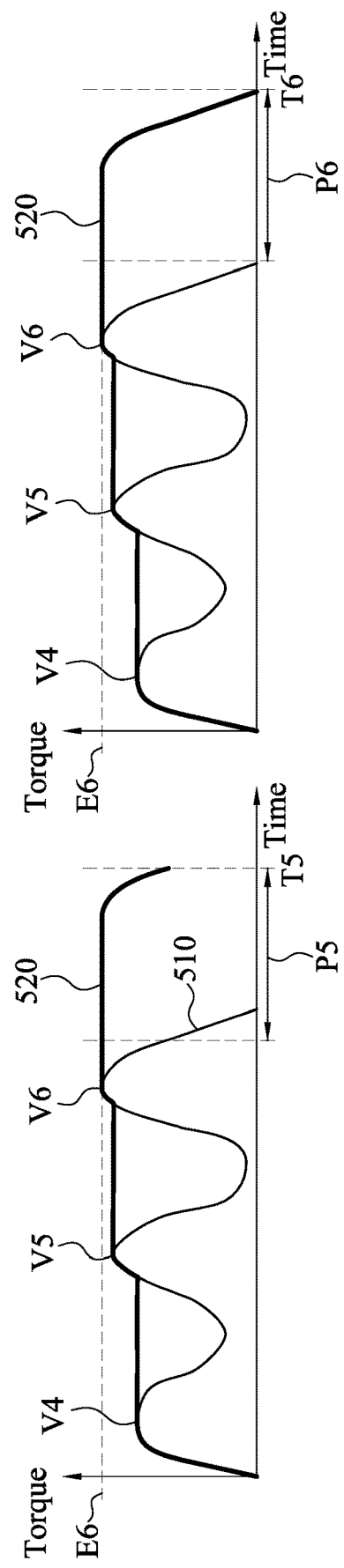

POWER ASSISTED ELECTRIC BICYCLE, TRANSMISSION DEVICE AND CONTROL METHOD

CROSS-REFERENCE TO RELATED APPLICATION(S)

This application claims priority to Taiwan Application Serial Number 108138465, filed on Oct. 24, 2019, the entire content of which is incorporated herein by reference as if fully set forth below in its entirety and for all applicable purposes.

TECHNICAL FIELD

The present disclosure relates to a vehicle and a control method. More particularly, the present disclosure relates to a power assisted electric bicycle and a control method.

BACKGROUND

Bicycles are the most convenient transportation. Recently, bicycles are developed to have auxiliary power to provide easier riding experience for users. Such bicycles are, for example, power assisted electric bicycles, which allows user to save physical strength because of the auxiliary power. As such, users are more inclined to choose bicycles with auxiliary power.

However, the current power assisting methods are not perfect. For example, the power of automatic assistance is often not in line with the user's pedaling experience, which in turn reduces the user's willingness to use a power assisted bicycle. Accordingly, there is a need to solve the problem that the power assistance of the bicycle is different from the actual experience.

SUMMARY

The summary aims to provide a brief description of the disclosure so that readers can understand the disclosure fundamentally. The summary does not describe the disclosure completely, and does not intend to specify the important/critical elements of the embodiments of the present disclosure or limit the scope of the present disclosure.

An embodiment of the present disclosure provides a power assisted electric bicycle. The power assisted electric bicycle includes a body, a wheel, a torque sensor, a motor and a controller. The torque sensor is configured to output a plurality of torque signals corresponding to a pedal force. The motor is configured to drive the wheel. The controller is coupled to the torque sensor and the motor. The controller is configured to: receive the torque signals from the torque sensor; compute and determine a first period according to a speed of the power assisted electric bicycle at a first time point; obtain a first maximum value of the torque signals in the first period which is before the first time point; and, set a first torque output of the motor according to the first maximum value corresponding to the torque signals.

Another embodiment of the present disclosure further provides a control method configured for a power assisted electric bicycle. The power assisted electric bicycle includes a body, a wheel disposed on the body, a torque sensor, a motor and a controller. The torque sensor is configured to output a plurality of torque signals corresponding to a pedal force. The motor is configured to drive the wheel. The control method includes the following steps: receiving the torque signals of the torque sensor; computing and determining a first period according to a speed of the power assisted electric bicycle at a first time point; obtaining a first maximum value of the torque signals in the first period which ends before the first time point; and, setting a first torque output of the motor according to the first maximum value corresponding to the torque signals.

Another embodiment of the present disclosure further provides a transmission device configured to provide a power output of a power assisted electric bicycle. The transmission device includes a torque sensor, a motor and a controller. The torque sensor is configured to output a plurality of torque signals corresponding to a pedal force. The motor is configured to drive a wheel. The controller is coupled to the torque sensor and the motor. The controller is configured to: receive the torque signals from the torque sensor; compute and determine a first period according to a speed of the power assisted electric bicycle at a first time point; obtain a first maximum value of the torque signals in the first period that ends before the first time point; and set a first torque output of the motor according to the first maximum value corresponding to the torque signals.

It is to be understood that both the foregoing general description and the following detailed description are by examples, and are intended to provide further explanation of the disclosure as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5A to FIG. 5F depict schematic diagrams of curves regarding identifying torque signals, which are generated by a torque sensor when a power assisted electric bicycle is pedaled, and a torque output of a motor correspondingly according to some other embodiments of the present disclosure;

DETAILED DESCRIPTION

Figure 1:
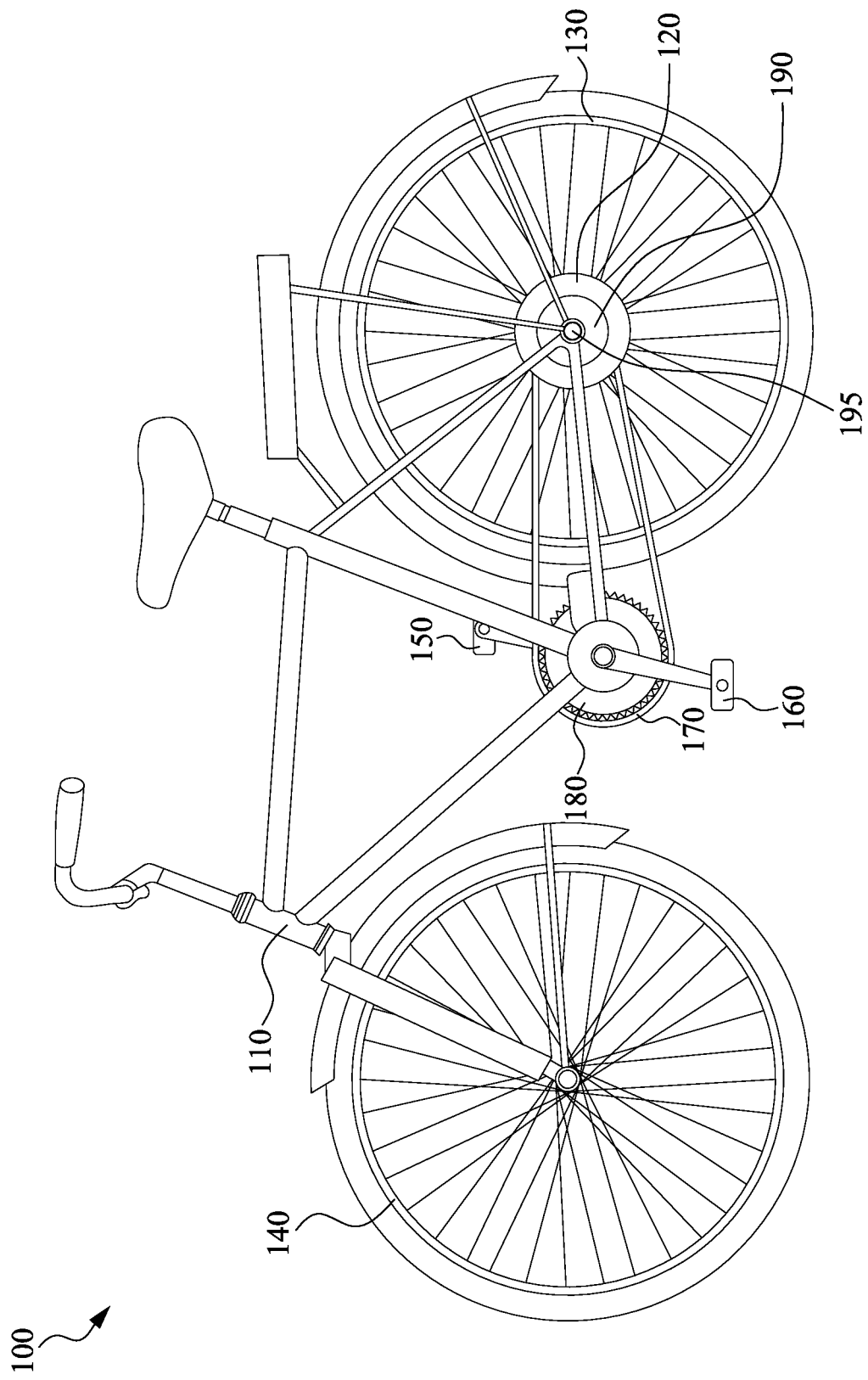
FIG. 1 depicts a schematic diagram of the appearance of a power assisted electric bicycle according to some embodiments of the present disclosure.

It should be understood that the following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms (such as "beneath," "below," "lower," "above," "upper" and the like) may be used herein for ease of description to describe one element or feature's relationship to another element(s) or feature(s) as illustrated in the figures. The spatially relative terms are intended to encompass different orientations of the device in use or operation steps in addition to the orientation depicted in the figures. The apparatus may be otherwise oriented (rotated 90 degrees or at other orientations) and the spatially relative descriptors used herein may likewise be interpreted accordingly.

Reference is made to FIG. 1. FIG. 1 depicts a schematic diagram of the appearance of a power assisted electric bicycle 100 according to some embodiments of the present disclosure. As shown in FIG. 1, the power assisted electric bicycle 100 includes a body 110 and a transmission device 120. The transmission device 120 is disposed on the body 110. The body 110 may be, but is not limited to, a one-wheeled or multi-wheeled bicycle, a power assisted electric bicycle or some other transportation vehicles that generate driving force through torque. In the present disclosure, a two-wheeled bicycle is used for illustration, but the implementation is not limited to this.

In some embodiments, the transmission device 120 is disposed on the body 110 and is connected to a rear wheel 130, for example, through a transmission gear set or some other transmission component. Alternatively, the transmission device 120 may be directly fixed to the rear wheel 130, as shown in FIG. 1. When a user pedals a right pedal 150 and a left pedal 160 to ride the power assisted electric bicycle 100, a chain 170 is driven by rotations of the right pedal 150 and the left pedal 160, so that the chain 170 can drive the transmission device 120 and the rear wheel 130 to rotate. In this manner, the transmission device 120 can receive a pedal force exerted by the user. In some other embodiments, the transmission device 120 may also be connected to a front wheel 140 of the body 110 or fixed to the front wheel 140. When the user pedals the right pedal 150 and the left pedal 160 to ride the power assisted electric bicycle 100, the transmission device 120 can receive the pedal force exerted by the user so as to output power to assist the user in riding. In some embodiments, the chain 170 may be a belt or some other components for force transmission.

Figure 2A:
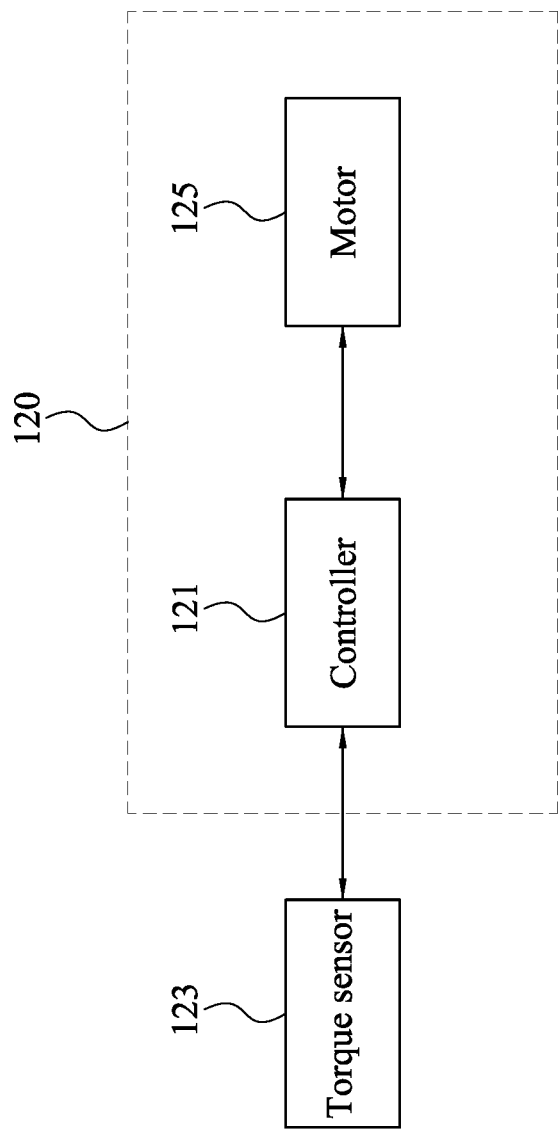
FIG. 2A depicts a functional block diagram of a transmission device according to some embodiments of the present disclosure.

In some embodiments, the power assisted electric bicycle 100 includes the body 110, a wheel (the front wheel 140 and/or the rear wheel 130), a torque sensor 123, a motor 125 and a controller 121. As shown in FIG. 1 and FIG. 2A and/or FIG. 2B, the wheel is disposed on the body 110. The torque sensor 123 is configured output a plurality of torque signals corresponding to the pedal force. The motor 125 is configured to drive the wheel (the front wheel 140 and/or the rear wheel 130). The controller 121 is coupled to the torque sensor 123 and the motor 125. The controller 121 is configured to perform a plurality of steps of, for example, receiving the torque signals from the torque sensor 123, computing and determining a first period according to a speed of the power assisted electric bicycle 100 at a first time point, obtaining a first maximum value of the torque signals in the first period that ends before the first time point, and, setting a first torque output of the motor 125 according to the first maximum value corresponding to the torque signals. Detailed description of the steps is provided below.

Reference is made to FIG. 2A. FIG. 2A depicts a functional block diagram of a transmission device 120 according to some embodiments of the present disclosure. In the embodiment shown in FIG. 2A, the torque sensor 123 is disposed adjacent to the right pedal 150 and the left pedal 160 of the power assisted electric bicycle 100 shown in FIG. 1. For example, the torque sensor 123 is fixed next to a rotating shaft linking the right pedal 150 and the left pedal 160 so as to detect the pedal force exerted by the user through the rotating shaft which rotates simultaneously with the right pedal 150 and the left pedal 160. In some embodiments, the torque sensor 123 may be disposed adjacent to a transmission system (that is, the right pedal 150, the left pedal 160, a pedaling input shaft sprocket 180, the chain 170, the transmission device 120, the rear wheel 130, etc.) to which the torque sensor 123 is easy to be installed.

The transmission device 120 includes the controller 121 and the motor 125. The controller 121 is coupled to the torque sensor 123 and the motor 125. The controller 121 is configured to receive the plurality of torque signals corresponding to continuous time points generated by the torque sensor 123, and set/control the torque output of the motor 125 according to values and a pattern (such as a user's pedaling frequency/period) of the torque signals. The controller 121 may be a motor control unit (MCU), an electric control unit (ECU), some other components with computing capabilities or a combination thereof. In some embodiments, the motor 125 is coupled to the rear wheel 130 of the body 110 of FIG. 1. Alternatively, for example, the motor 125 is fixed to the rear wheel 130 in the embodiment shown in FIG. 1. The motor 125 is configured to convert electrical energy to generate a torque correspondingly according to information or commands sent by the controller 121, thereby assisting a movement of the body 110 in addition to the driving force caused by the pedal force exerted by the user.

Figure 2B:
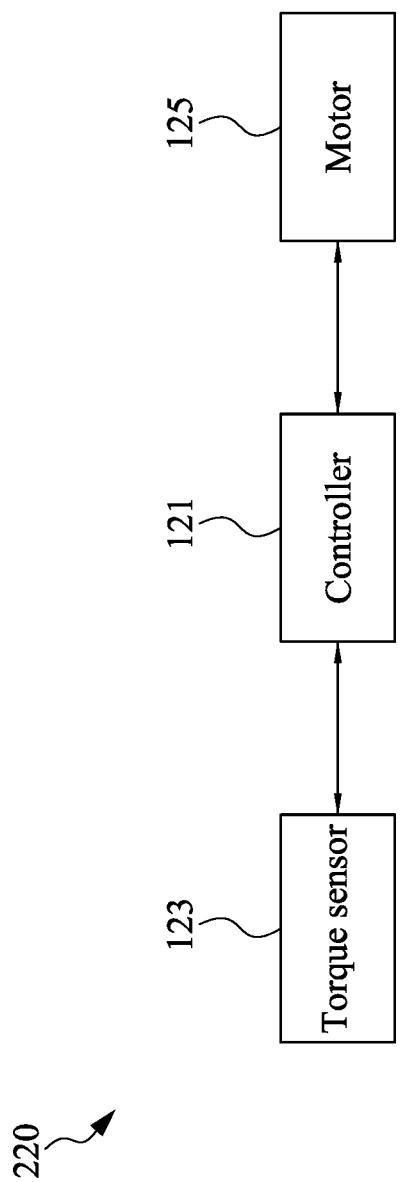
FIG. 2B depicts a functional block diagram of a transmission device according to some other embodiments of the present disclosure.

Reference is made to FIG. 2B. FIG. 2B depicts a functional block diagram of a transmission device 220 according to some other embodiments of the present disclosure. In FIG. 2B, similar elements as those in FIG. 2A are represented by the same reference numbers, and the description of the similar elements is provided in the embodiment of FIG. 2A. As compared with FIG. 2A in which the torque sensor 123 is disposed outside the transmission device 120, the torque sensor 123 is disposed in the transmission device 220 in the embodiment of FIG. 2B. For example, as shown in the embodiment of FIG. 1, the transmission device 120 is fixed to the rear wheel 130, and the transmission device 120 and the rear wheel 130 are fixed to the body 110 through a rear shaft 195. The torque sensor 123 then can be disposed adjacent to the rear shaft 195, so as to obtain a measured torque by detecting a relative movement between the rear shaft 195 and the rear wheel 130. The torque sensor 123 is coupled to the controller 121 and is configured to measure the pedal force exerted by the user's two feet to compute and output the torque signals corresponding to the pedal force at continuous time points. The torque sensor 123 may be, but is not limited to, a non-contact type torque sensor (such as an inductive torque sensor), a contact type torque sensor (such as a potentiometer-type torque sensor or a mechanical torque sensor), an optical torque sensor, etc.

Figure 3:
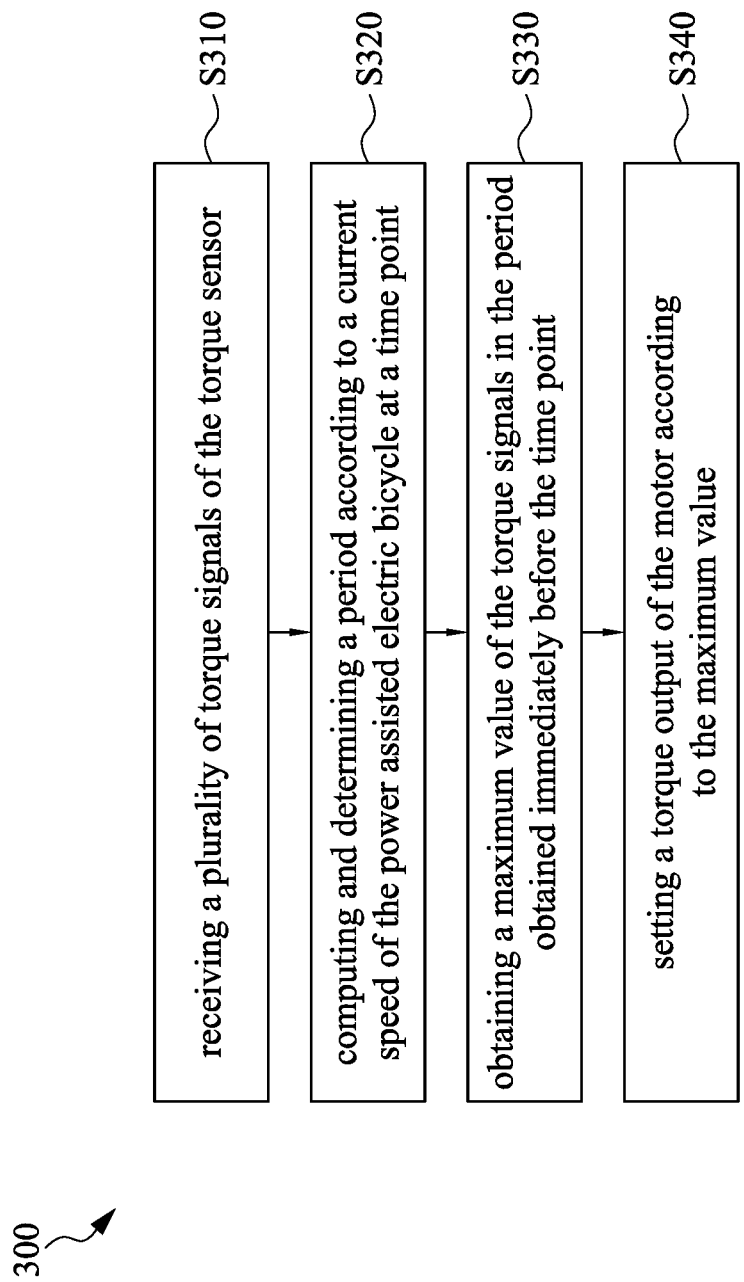
FIG. 3 depicts a flow chart of a control method according to some embodiments of the present disclosure.

Reference is made to FIG. 3. FIG. 3 depicts a flow chart of a control method 300 according to some embodiments of the present disclosure. The control method 300 according to the present disclosure is configured for the power assisted electric bicycle 100 of FIG. 1. In order to clearly illustrate the various steps of the control method 300, reference is made to FIG. 2A and FIG. 3 together.

In step S310, a plurality of torque signals of the torque sensor 123 are received. The plurality of torque signals corresponding to the pedal force are outputted by the torque sensor 123. The plurality of torque signals may correspond to time-continuous sampling data of the pedal force exerted by the user. For example, when the user is riding the power assisted electric bicycle 100, the torque sensor 123 is configured to detect the pedal force exerted by the user and computes the plurality of torque signals through continuous sampling. The controller 121 is then configured to obtain the plurality of torque signals from the torque sensor 123 for further analysis.

In step S320, a period according to a current speed of the power assisted electric bicycle at a time point is computed and determined by the controller 121. For example, the time point may be the current time point, and the current speed is used as a basis to compute and determine the period. The controller 121 is configured to compute and determine the period in real time according to a rotation speed at short intervals (such as 0.1 milliseconds, which is the same as a sampling frequency of the pedal force sampled by the torque sensor 123). Therefore, lengths of periods computed and determined by the controller 121 at different time points will vary because of different speeds.

In the embodiment where the torque sensor 123 is disposed adjacent to the right pedal 150 and a left pedal 160 of FIG. 1, the controller 121 is configured to compute the following equation (1) to obtain the period:

$$P=0.5/S \qquad \text{equation (1)}$$

Where P is the period and S is the speed of the power assisted electric bicycle 100. It is noted that the period described here conceptually corresponds to (but is not exactly equal to) a period of pedaling the pedals (the right pedal 150 and the left pedal 160) by the user. That is, the user roughly knows the rhythm/frequency of pedaling required to maintain the current speed. Since both the right pedal 150 and the left pedal 160 have the ability to generate pedal force, the period described here is not a period of pedaling an entire cycle but a period of pedaling the right pedal 150 or the left pedal 160 for once (i.e., a length of a period corresponding to pedaling for a half cycle). Therefore, equation (1) needs to be divided by two (that is, 0.5 of equation (1)) to obtain the above period.

In addition, the speed is a speed at which the front wheel 140 and the rear wheel 130 rotate. In some embodiments, the power assisted electric bicycle 100 further includes a speedometer disposed adjacent to the front wheel 140 or the rear wheel 130 and coupled to the controller 121. The speedometer is configured such that the controller 121 can obtain the rotation speed of the front wheel 140 or the rear wheel 130 in real time. In some embodiments, the transmission device or the motor is fixed to one wheel of the power assisted electric bicycle (for example, the motor 125 of the transmission device 120 is fixed to the rear wheel 130 as shown in the embodiment of FIG. 1), and the speed is equal to the rotation speed of the motor 125. In such an embodiment, a current rotation speed of the motor 125 can be obtained through the information of a detector (not shown in the figure) inside the motor 125 (for example, a position sensor that detects the relationship between the stator and the rotor of the motor 125). In some embodiments, the motor 125 is not fixed to one wheel of the power assisted electric bicycle 100 but is disposed in a way that the two still drive each other to rotate (for example, the motor 125 drives the wheel when the motor 125 outputs a torque, and the wheel can still drive the motor 125 when the motor 125 does not output the torque, so that the motor 125 can have the function of regenerative braking, etc.). In these embodiments, the controller 121 can still obtain the current speed through the detector (not shown in the figure) inside the motor 125.

In step S330, a maximum value of the torque signals is obtained by the controller 121, and the maximum value is in the period obtained from the above computation that ends before the time point. After the controller 121 computes and determines the period in step S320, it uses the current time point as the end point and goes backward in time by a length of time (that is, the period), and the controller 121 is configured to detect the maximum value of the torque signals during this period of time. For example, the controller 121 has operated the motor 125 for 10 seconds so far. It is assumed that the current period is computed to be 5 seconds according to the current speed at the current time point (the tenth second). Therefore, the period immediately before the current time point is the five seconds before the tenth second, which is the time interval from the fifth second to the tenth second. As a result, in step S330, the controller 121 will analyze the torque signals obtained in the time interval from the fifth second to the tenth second and obtain the maximum value of the torque signals from the torque signals. At the next time point, such as the eleventh second, the computed period is shortened to three seconds due to the increase in speed at this time. Then, the controller 121 will analyze the torque signals from the eighth to the eleventh second and obtain the maximum value of the torque signals from the torque signals. The above description is only taken as an example. In fact, in practical applications, the sampling frequency (or sampling interval) at which the controller 121 samples and computes to obtain the maximum value of the torque signals should be much shorter than one second.

In step S340, a torque output of the motor 125 is set by the controller 121 according to the maximum value of the torque signals. That is to say, the torque output of the motor 125 will be changed in real time due to the change of the maximum value of the torque signals. It is noted that, when the speed is faster, the pedaling of the user should be more intense and the length of the period computed by the controller 121 is shorter according to equation (1). On the contrary, when the speed is slower, the pedaling of the user should be slowed down and the length of the period computed by the controller 121 is longer. That is, the controller 121 is configured to dynamically refer to the current speed (in some embodiments, the speed is proportional to the current rotation speed of the motor 125) to determine the length of the period.

When the user is riding the bicycle and the auxiliary power function of the power assisted electric bicycle 100 is turned on, the controller 121 will repeatedly perform step S310 to step S340 of the control method 300. In some embodiments, when the maximum value of the torque signals in the period is different from the last determination of the maximum value of the torque signals (that is, the maximum value of the torque signals determined at the previous time point), the controller 121 will set/adjust the torque output of the motor 125 according to the maximum value of the torque signals in the current period. It is noted that, as shown in the above equation (1), the length of the period is inversely proportional to the speed (and the rotation speed of the motor 125). The faster the speed is (the larger the value), the shorter the length of the period, and a data window (that is, corresponding to the period) that accommodates the torque signals for magnitude comparison will change accordingly. In other words, when the speed is faster, that is, when the pedaling of the user is more frequent (or, in addition, the torque output of the motor that is increased in response to the pedaling of the user), the controller 121 only evaluates torque signals in a smaller time interval (a shorter period, a smaller data window) before the current time point. As a result, the controller 121 can make a real-time response and determination in response to each pedaling of the user, so that the auxiliary power provided by the motor 125 can assist the riding of the user in real time.

Therefore, the method according to the present disclosure can prevent the situation in which the user has already increased the current movement speed with a larger pedal force at an earlier time point (for example, 1 minute before) and gradually reduced the pedal force due to the increase of speed during this one minute, but the controller 121 still controls the motor 125 at the current time point to provide the auxiliary power in response to the large pedal force happened one minute before. This situation will expose the user to dangerous problems caused by excessive speed, the movement speed not in line with the current situation, or loss of center of gravity.

In some embodiments, when the speed is not zero but the controller 121 does not receive a torque signal corresponding to the pedal force of the user from the torque sensor 123, the power assisted electric bicycle 100 probably remains in a gliding state or goes downhill. At this time, the maximum value of the torque signals determined by the controller 121 gradually decreases because no action that generates the pedal force occurs, and the torque output of the motor 125 that is correspondingly set/adjusted will decrease at the same time. When such a detection result is maintained for more than a certain period of time, the controller 121 will reset a value of the torque output of the motor to zero since torques in the period (that is, the data window) are all zero. In some other embodiments, since the speed in equation (1) cannot be zero, the controller 121 will set a threshold for a maximum value of the period. When the speed gradually becomes zero, a period value will be maintained at the set threshold. The threshold of the period may be set by referring to the actual configurations (such as the resistance between tires and the ground, the resistance generated by the regenerative braking of the motor 125 in the transmission device 120, etc.) of the power assisted electric bicycle 100, or the requirements of national traffic laws or regulations (for example, the output needs to be adjusted to zero when there is no pedaling in a certain time or distance, etc.).

Reference is made to FIG. 2B and FIG. 1 again. As compared with FIG. 2A in which the torque sensor 123 is disposed on the right pedal 150 and the left pedal 160 of FIG. 1, the torque sensor 123 of FIG. 2B is disposed in the transmission device 220. In the present embodiment, the transmission device 220 can also perform step S310 to step S340 of the control method 300 in FIG. 3. It is noted that the controller 121 is configured to compute the following equation (2) to obtain the period when performing step S320:

$$P = 0.5 * GR/S \quad \text{equation (2)}$$

Where P is the period, and GR is the gear ratio which represents a ratio of a number of teeth of a pedaling input shaft sprocket 180 to a number of teeth of a wheel gear 190. For example, if the number of teeth of the pedaling input shaft sprocket 180 is seventy-two and the number of teeth of the wheel gear 190 is twenty-four, then the gear ratio is three. In other words, when the user pedals the pedal for one cycle, the rear wheel 130 (and the motor 125 linked thereto) will rotate for three cycles in response to this pedaling. Therefore, through equation (2), the gear ratio can be utilized to restore the relationship between the current speed and the pedaling of the user, so that the computed period can be close to the user's actual pedaling period.

In the embodiment shown in FIG. 1 and FIG. 2B, the speed is the same as the rotation speed of the motor 125 because the motor 125 in the transmission device 120 and the torque sensor 123 are fixed to the rear wheel 130. In some embodiments, the motor 125 in the transmission device 120 is not fixed to the rear wheel 130 as shown in the embodiment of FIG. 1, but is connected by other transmission components (such as a gear set/gearbox, etc.). As a result, if the rotation speed of the motor 125 is used to derive the current speed, the proportional relationship between the rotation speed of the motor 125 and the speed (for example, the ratio of the gear set, the current transmission range of the gearbox, etc.) must also be considered in addition to the gear ratio in the above equation (2).

In the control method 300 according to the present disclosure, each period dynamically varies with the overall state (that is, the speed). In other words, the length of each of the periods varies depending on the gear ratio and motor speed, so that a number of torque signals used to compute the torque output in each period is different (for example, the higher the speed or the speed of the motor 125 is, the shorter the period, and the number of torque signals obtained by sampling from the data window corresponding to the shorter period is less). In this manner, the power assistance output of the motor 125 is more in line with the pedaling period of the user. That is to say, the dynamic adjustments of the period and its corresponding data window can dynamically match the user's pedaling, so that the data window can include the user's most recent pedaling (for example, includes a peak value of the torque signal caused by most recent pedaling) every time the maximum value of the torque signals is determined without being affected by the previous pedaling. For example, when the user pedals more intensely, the subsequent shorter period can allow the controller 121 to dynamically adjust the power assistance output of the motor 125 in real time according to each pedaling of the user, so that the pedaling of the user can be slowed down due to the power assistance compensation of the motor 125. In such a way, the assistance provided by the power assisted electric bicycle is thus achieved. On the other hand, such a configuration can also avoid the situation in which the user is unable to understand and anticipate the actuation of the power assisted electric bicycle 100. Such a situation may be caused by the power assistance output by the motor 125 being not in line with the actual riding condition of the user, thereby causing the power assisted electric bicycle 100 to accelerate or decelerate suddenly.

FIG. 4A to FIG. 4F depict schematic diagrams of curves regarding identifying torque signals generated by a torque sensor when a power assisted electric bicycle is pedaled and a torque output of a motor correspondingly according to one embodiment of the present disclosure. The following description is provided with reference to FIG. 1 and FIG. 2A. Torque curves 410 of FIG. 4A to FIG. 4F are torque signals corresponding to the pedal of the user on the right pedal 150 and the left pedal 160. The torque curves 410 of FIG. 4A to FIG. 4F can be regarded as a change in the torque signal corresponding to the continuous pedaling of the user over a period of time. Torque output curves 420 of FIG. 4A to FIG. 4F are torque outputs generated correspondingly by the motor 125 under the control of the controller 121 in response to the above change in the torque signal. In order to make a distinction from the detected torque curves 410, the torque output curves 420 are represented by thick lines in FIG. 4A to FIG. 4F. In the following, the continuous pedaling is divided into multiple time intervals in FIG. 4A to FIG. 4F and is described in sequence.

In some embodiments, when the right pedal 150 and the left pedal 160 are at a same mid-horizontal height, a highest point of the torque curve 410 (that is, the peak of the torque curve 410) is a torque signal when the right pedal 150 or the left pedal 160 is at a horizontal position. With the right pedal 150 (or the left pedal 160) being pedaled down on to be rotated down from the horizontal position to a lowest position, a lowest point of the torque curve 410 (that is, the valley of the torque curve 410) is a torque signal when the right pedal 150 (or the left pedal 160) is at the lowest position.

For example, the torque sensor 123 constantly detects the torque signals of the right pedal 150 and the left pedal 160. Because the right pedal 150 and the left pedal 160 are at the mid-horizontal height (for example, the right pedal 150 is at the front and the left pedal 160 is at the back), a force exerted by the user is approximately vertical to a crank (not marked) connected between the right pedal 150 and the pedaling input shaft sprocket 180. Therefore, the torque sensor 123 can detect the maximum torque signal. On the other hand, when the right pedal 150 is rotated to a lowest point (the left pedal 160 is at a highest point at this time), similar to the above reason, torque produced by the pedal force applied to the crank (not marked) is approximately zero. As a result, the torque sensor 123 can hardly detect any torque signal.

Therefore, the torque signal generated when the right pedal 150 (or the left pedal 160) is pedaled for a half cycle from the mid-horizontal height will correspond to the continuous part between two adjacent peaks in the torque curve 410. The torque signal generated when the right pedal 150 (or the left pedal 160) is pedaled for a half cycle from the highest point will correspond to the continuous part between two adjacent valleys in the torque curve 410.

In order to clearly illustrate step S310 to step S340 of FIG. 3, the following description is provided with reference to FIG. 1, FIG. 2A, and FIG. 4A to FIG. 4F. In the embodiment shown in FIG. 4A to FIG. 4F, the torque output of the motor 125 gradually decreases according to the pedaling state of the user. Such an embodiment may be applied when the user rides on a flat road. In such a situation, the speed is increased along with the increase in the output of the pedal force and the torque output of the motor 125; once the speed is up, the required pedal force and the torque output of the motor 125 gradually decreases.

Figure 4B:
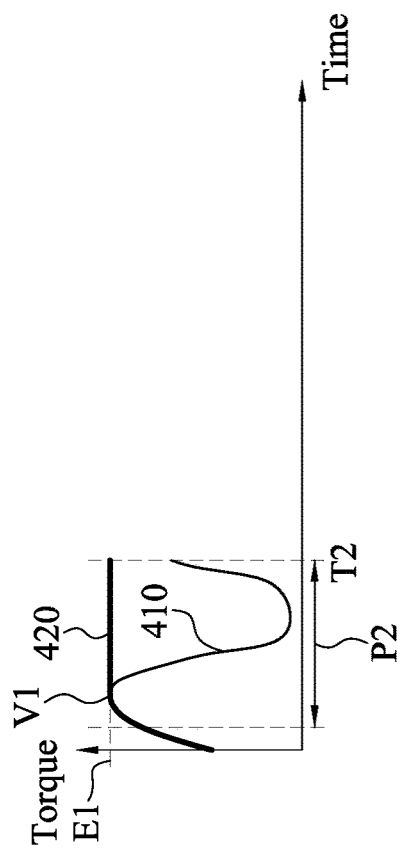
FIG. 4A to FIG. 4F depict schematic diagrams of curves regarding identifying torque signals, which are generated by a torque sensor when a power assisted electric bicycle is pedaled, and a torque output of a motor correspondingly according to one embodiment of the present disclosure.
Figure 4A:
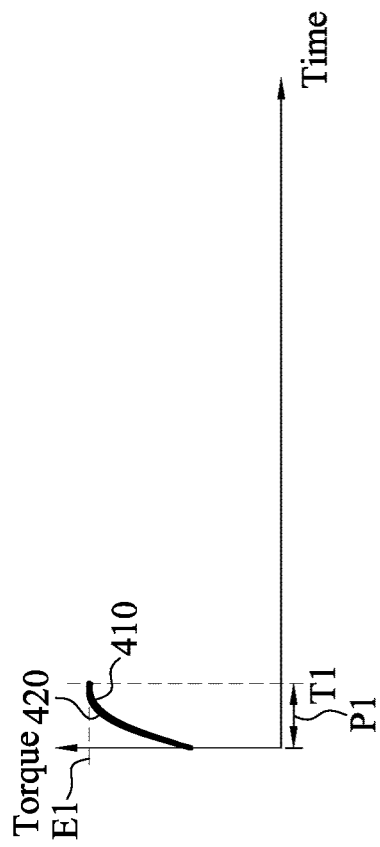

FIG. 4A depicts a schematic diagram of an initial state. For example, the user starts to ride the power assisted electric bicycle 100 from a stationary state. During the process from a time point 0 to a time point T1, the controller 121 receives the torque signals generated by pedaling the right pedal 150 and the left pedal 160 by the user, as shown in the torque curve 410. The controller 121 will obtain a new maximum value of the torque signals when performing step S310 to step S330 at each time point (for example, corresponding to or proportional to the sampling frequency of the torque signal). As a result, the controller 121 sets the torque output of the motor 125 according to the new maximum value of the torque signals at each time point in step S340, as shown in the torque output curve 420. In FIG. 4A, the torque curve 410 and the torque output curve 420 coincide.

In the present embodiment, since the power assisted electric bicycle 100 has just started to move (for example, the rotation speed of the motor 125 connected to the rear wheel 130 is slower), a length of a period P1 may be longer than a time over which the power assisted electric bicycle 100 has been ridden (that is, a time length corresponding to the period P1 is longer than a length from the time point T1 to the time point 0) even if the period P1 is computed and determined according to the current speed in step S320. However, because there is no torque signal before the time point 0, and it is still the initial state of riding at the time point T1 in which the torque signal increases, the setting of the torque output of the motor 125 is not affected.

In the present embodiment, the motor 125 is set by the controller 121 to operate with the torque output of a value E1 at the time point T1.

Reference is made to FIG. 4B. During the process in which the user continues to ride, a time point T2 is used as the current time for illustration, in which the time point T2 is another time point after the time point T1 of FIG. 4A. The controller 121 is configured to receive the torque signals in step S310, as shown in the torque curve 410 of FIG. 4B. The controller 121 is configured to compute and determine a period P2 according to the current speed in the above step S320. At the time point T2, the controller 121 is configured to determine whether a maximum value of the torque signals within the period P2, which is before the time point T2 with time point T2 as the end point (that is, the time interval from a time point (T2-P2) to the time point T2), is different from a maximum value of the torque signals that has been currently determined. For example, among the torque signals generated by the first pedaling of the user, the value E1 corresponds to a peak V1 of the torque curve 410, which is a maximum value of the torque obtained at the time point T1 when the controller 121 makes the determination at the time point T1. After the time point T1 and before the time point T2, the torque curve 410 has a trend of decreasing to a minimum value before it starts increasing. In step S330, the maximum value of the torque signals in the period P2 immediately before the time point T2 (that is, the time interval from the above time point (T2-P2) to the time point T2) is still the value E1 obtained at the time point T1. Therefore, the motor 125 does not change the torque output of the motor 125 at the time point T2 and maintains the torque output at the value E1, such as the horizontal curve part of the torque output curve 420 (corresponding to the value E1). In fact, after the time point T1 and before the time point T2, the controller 121 should make more than one determination. However, as can be understood from the torque curve 410 of FIG. 4B, the controller 121 still continues to determine the maximum value of the torque signals during this period as the value E1 since this time interval does not include any pedaling corresponding to the horizontal position (that is, another peak other than the peak V1 on the torque curve 410), and the torque output of the motor 125 is maintained to match the value E1.

Figure 4D:
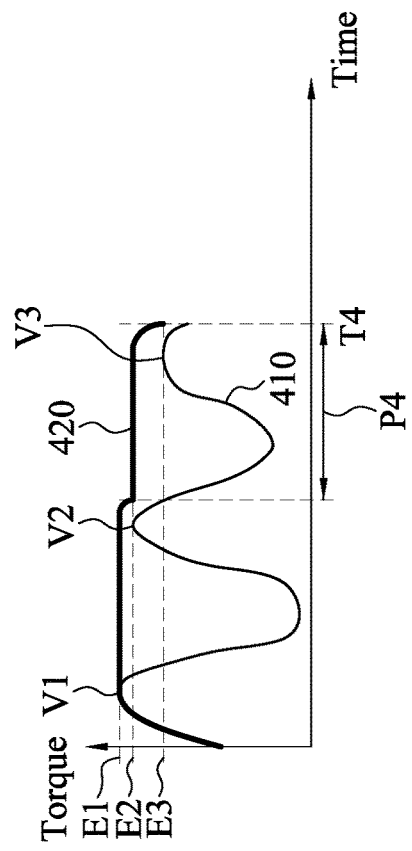
Figure 4C:
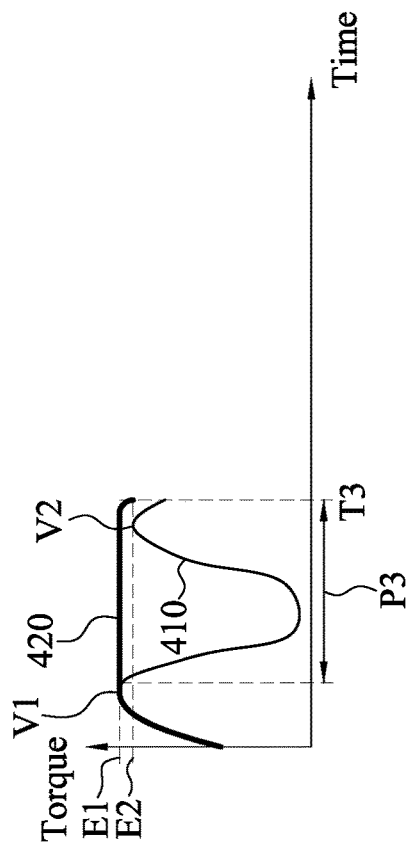

During the process in which the user continues to ride, FIG. 4C is illustrated by taking a time point T3 as the current time, in which the time point T3 is another time point after the time point T2 of FIG. 4B. The controller 121 is configured to receive the torque signals in step S310, as shown in the torque curve 410 of FIG. 4C. The controller 121 is configured to compute and determine a period P3 according to the current speed in the above step S320. At the time point T3, the controller 121 is configured to determine whether a maximum value of the torque signals within the period P3, which is before the time point T3 with time point T3 as the end point (that is, the time interval from a time point (T3-P3) to the time point T3), is different from a maximum value of the torque signals that has been currently determined. For example, the maximum value of the torque signals that has been currently determined is the value E1 computed and obtained at the time point T1 in FIG. 4A. In step S330, the controller 121 obtains a new maximum value from the torque signals in the period P3 immediately before the time point T3 (that is, the time interval from the time point (T3-P3) to the time point T3) at the time point T3, which is a value E2 of a peak V2. The value E2 is different from the value E1. In other words, the torque curve 410 includes another peak V2 other than the peak V1 in the period P3 immediately before the time point T3. Hence, the controller 121 sets the torque output of the motor 125 according to the maximum value (that is, the value E2) in step S340. As a result, at the time point T3 which is after the occurrence of the maximum value, the motor 125 starts to provide the torque output with the updated value E2, as shown in the torque output curve 420 of FIG. 4D.

In the present embodiment, the value E2 is smaller than the value E1. That is, the motor 125 will reduce the torque output after the time point T3. It is noted that if the maximum value determination is performed at the time point when the maximum value occurs, the immediately adjacent period may still include the peak of the torque curve 410 corresponding to the last pedaling at the horizontal position. Therefore, the controller 121 needs to delay a little more time (for example, the time point T3) to modify the torque output according to the new maximum value of the torque signals. However, this time difference only occurs when the pedal force is smaller than the previous pedal force, and the user is essentially not sensitive to the power assistance outputted by the motor 125. In addition, the above time difference is also gradually decreased as the speed increases, so it does not generally affect the riding experience of the user.

During the process in which the user continues to ride, FIG. 4D is illustrated by taking a time point T4 as the current time, in which the time point T4 is another time point after the time point T3 of FIG. 4C. The controller 121 is configured to receive the torque signals in step S310, as shown in the torque curve 410 of FIG. 4D. The controller 121 is configured to compute and determine a period P4 according to the current speed in the above step S320. At the time point T4, the controller 121 is configured to determine whether a maximum value of the torque signals within the period P4, which is before the time point T4 with time point T4 as the end point (that is, the time interval from a time point (T4-P4) to the time point T4), is different from a maximum value of the torque signals that has been currently determined. For example, the maximum value of the torque signals that has been currently determined is the value E2 computed and obtained at the time point T3 in FIG. 4C. In step S330, the controller 121 obtains a new maximum value from the torque signals in the period P4 immediately before the time point T4 (that is, the time interval from the time point (T4-P4) to the time point T4) at the time point T4, which is a value E3 of a peak V3. The value E3 is different from the value E2. The controller 121 sets the torque output of the motor 125 according to the maximum value (that is, the value E3) in step S340. As a result, at the time point T4 which is after the occurrence of the maximum value, the motor 125 starts to provide the torque output with the updated value E3, as shown in the torque output curve 420 of FIG. 4E.

In the present embodiment, the value E3 is smaller than the value E2. That is, the motor 125 reduces the torque output after the time point T4 according to the value E3.

Figure 4F:
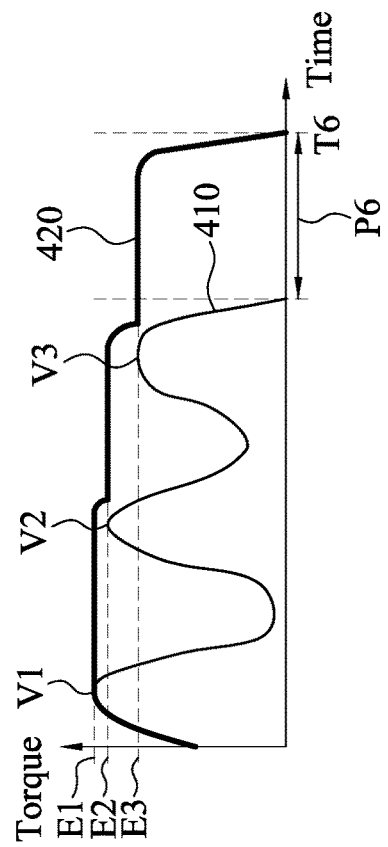
Figure 4E:
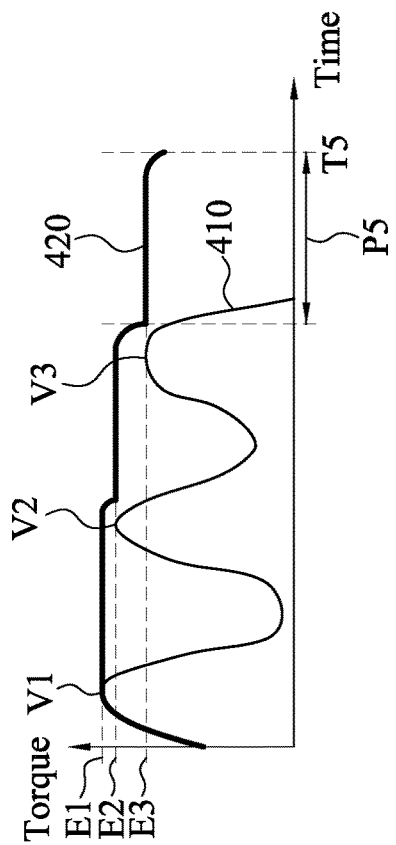

During the process in which the user continues to ride, FIG. 4E is illustrated by taking a time point T5 as the current time, in which the time point T5 is another time point after the time point T4 of FIG. 4D. The controller 121 is configured to receive the torque signals in step S310, as shown in the torque curve 410 of FIG. 4E. The controller 121 is configured to compute and determine a period P5 according to the current speed in the above step S320. At the time point T5, the controller 121 is configured to determine whether a maximum value of the torque signals within the period P5, which is before the time point T5 with the time point T5 as the end point (that is, the time interval from a time point (T5-P5) to the time point T5), is different from a maximum value of the torque signals that has been currently determined. For example, the maximum value of the torque signals that has been currently determined is the value E3 computed and obtained at the time point T4 in FIG. 4D. In step S330, at the time point T5, the torque signal in the period P5 immediately before the time point T5 (that is, the time interval from the time point (T5-P5) to the time point T5) gradually decreases. There is no peak in this time interval, so that the motor 125 will output power at the value of E3 for a period of time, and then start to decrease the torque output based on the detected torque signal.

In some embodiments, after riding for a period of time, the user may let the power assisted electric bicycle 100 to continue to move forward, for example, by inertial power without any further pedaling. As shown in FIG. 4F, the controller 121 does not receive a new torque signal. In the present embodiment, the motor 125 still provides power output. The controller 121 is configured to compute and determine a period P6 according to the current speed in the above step S320. A current maximum value is the value E3 computed and obtained at the time point T4 in FIG. 4D. In step S330, at the time point T6, since the torque curve 410 in the period P6 immediately before the time point T6 (that is, a time interval from a time point (T5-P6) to the time point T6) does not include any peak corresponding to the pedaling of the user at the horizontal position and no new torque signal is received, a maximum value of the torque signals will be determined to be zero. In fact, in the determination of step S330 performed by the controller 121 between the time point (T6-P6) and the time point T6, the maximum value of the torque signals obtained has gradually decreased, so that the controller 121 is configured to control the motor 125 to decrease the torque output and let the motor 125 stop outputting torque at the time point T6, as shown in the torque output curve 420. As a result, after the user stops pedaling, the motor 125 will continue to maintain the torque output for a period of time and then decrease it to zero during the time interval from the time point (T6-P6) to the time point T6. After the time point T6, the user riding the power assisted electric bicycle 100 can glide a certain distance by using the forward inertia of the power assisted electric bicycle 100.

It is noted that the torque curves 410 and the torque output curves 420 in FIG. 4A to FIG. 4F show continuous torques. In order to illustrate the control method of the power assisted electric bicycle 100 according to the present disclosure in detail, the torques in several periods are discussed in the present disclosure. However, the present disclosure is not limited to the number of periods. The time points for computing the periods may be determined depending on practical situations when implementing, and periods of different lengths can be computed according to the current speed. For example, the period may be computed and the corresponding step S310 to step S340 may be performed according to the speed every one millisecond or several milliseconds.

FIG. 5A to FIG. 5F depict schematic diagrams of curves regarding identifying torque signals generated by the torque sensor 123 when the power assisted electric bicycle 100 is pedaled and a torque output of the motor 125 correspondingly according to some other embodiments of the present disclosure. The following description is provided with reference to FIG. 1 and FIG. 2A. FIG. 5A to FIG. 5F show an embodiment in which the torque output of the motor 125 gradually increases as the user pedals. Torque curves 510 in FIG. 5A to FIG. 5F are torque signals corresponding to the pedaling of the user on the right pedal 150 and the left pedal 160, and torque output curves 520 are torque outputs generated correspondingly by the motor 125 under the control of the controller 121 in response to the above change in the torque signals. The following description focuses on the changing of the torque outputs. Since the other portions of the steps are similar to the previous paragraphs of FIG. 4A to FIG. 4F, a description in this regard is not repeated here.

Figure 5B:
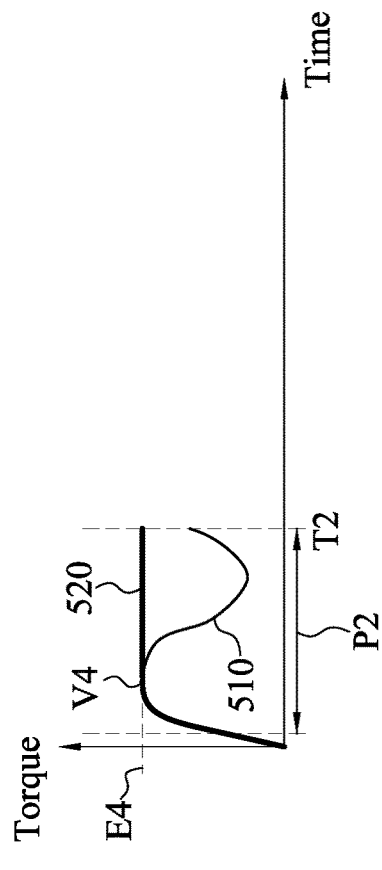
Figure 5A:
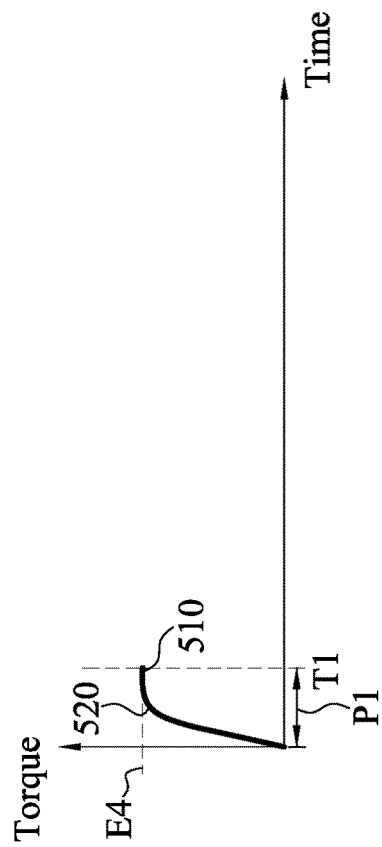

FIG. 5A depicts a schematic diagram of an initial state. For example, the user just starts to ride the power assisted electric bicycle 100. During the process from a time point 0 to a time point T1, the controller 121 is configured to receive the torque signals generated by pedaling the right pedal 150 and the left pedal 160, as shown in the torque curve 510. The controller 121 will obtain a new maximum value of the torque signals when performing step S310 to step S330 at each time point. As a result, the controller 121 sets the torque output of the motor 125 according to the new maximum value of the torque signals at each time point in step S340, as shown in the torque output curve 520. In FIG. 5A, the torque curve 510 and the torque output curve 520 coincide. In the present embodiment, the motor 125 is set by the controller 121 to operate with the torque output of a value E4 at the time point T1. The relevant computation of the period P1 and how to set the torque output of the motor 125 may be referred to the above description.

During the process in which the user continues to ride, a time point T2 is used as the current time for illustration, in which the time point T2 is another time point after the time point T1 of FIG. 5A. The controller 121 is configured to receive the torque signals in step S310, as shown in the torque curve 510 of FIG. 5B. In the present embodiment, in a period P2, which is before the time point T2 with the time point T2 as the end point (that is, a time interval from a time point (T2-P2) to the time point T2), the torque curve 510 has a trend of decreasing to a minimum value before it starts increasing. There is no value higher than E4 during the time interval of the period P2 (that is, there is no peak other than a peak V4). As a result, the motor 125 does not change the torque output of the motor 125 at the time point T2 and maintains the torque output at the value E4, such as the horizontal curve part of the torque output curve 520 (corresponding to the value E4). The relevant computation of the period P2 and how to maintain the torque output of the motor 125 may be referred to the above description.

Figure 5D:
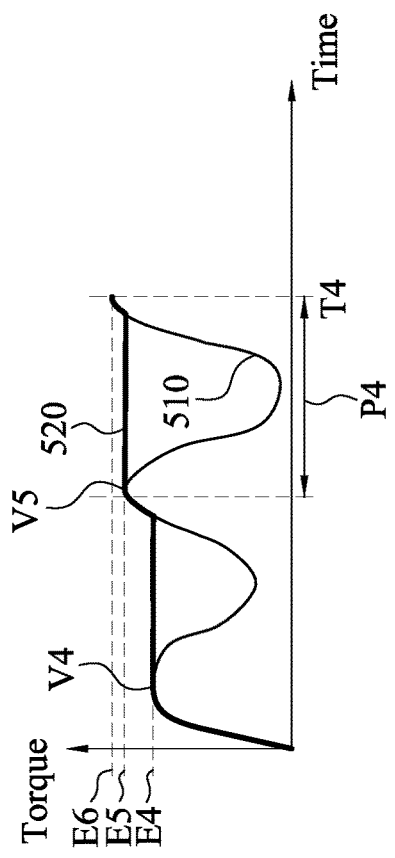
Figure 5C:
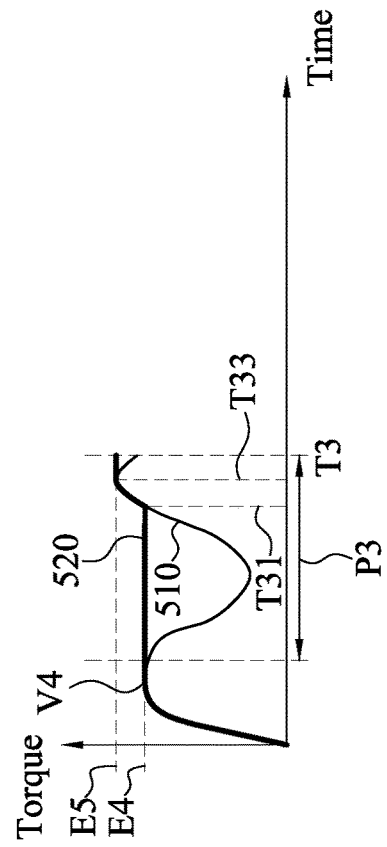

During the process in which the user continues to ride, FIG. 5C is illustrated by taking a time point T3 as the current time, in which the time point T3 is another time point after the time point T2 of FIG. 5B. The controller 121 is configured to receive the torque signals in step S310, as shown in the torque curve 510 of FIG. 5C. In the present embodiment, in a period P3, which is before the time point T3 with the time point T3 as the end point (that is, a time interval from a time point (T3-P3) to the time point T3), the torque curve 510 has a trend of decreasing to a valley and then increasing to a peak. The controller 121 obtains another peak V5 other than the peak V4 during the time interval of the period P3. As a result, the controller 121 is configured to reset the torque output of the motor 125 by using a new maximum value (that is, a value E5 of the peak V5) as shown in the torque output curve 520. The relevant computation of the period P3 and how to set the torque output of the motor 125 may be referred to the above description.

It is noted that the part of the torque curve 510 between a time point T31 and a time point T33 represents a situation in which the user gradually increases the pedal force and the pedal force is greater than a current torque output. As such, the torque curve 510 shows an upward trend. In the present embodiment, since the torque signals at every moments from the time point T31 are greater than the value E4, the controller 121 will adjust the torque output of the motor 125 according to a current torque signal in real time, so that the power output of the motor 125 (for example, the torque output curve 520) also shows an upward trend. For example, the controller 121 obtains a greater maximum value relative to a previous time point (that is, the value of the maximum value is updated) at each of the time point T31, . . . to the time point T33. The controller 121 is configured to reset the torque output of the motor 125 by using the updated maximum value. As a result, the torque output curve 520 representing the torque output and the torque curve 510 representing the torque signal will coincide between the time point T31 and the time point T33. Accordingly, under the circumstances that the user increases the pedal force, the user can feel the auxiliary power provided by the power assisted electric bicycle 100 in real time because the torque output can be fed back in real time according to the present disclosure. The situation in which the motor 125 does not provide the auxiliary power until the user has pedaled for a period of time (when the speed has begun to rise) is avoided. Therefore, the power assisted electric bicycle 100 according to the present disclosure can feed back the torque output in real time, which can avoid the problem of unstable speed.

During the process in which the user continues to ride, a time point T4 is used as the current time for illustration, in which the time point T4 is another time point after the time point T3 of FIG. 5C. The controller 121 is configured to receive the torque signals in step S310, as shown in the torque curve 510 of FIG. 5D. In the present embodiment, in a period P4, which is before the time point T4 with the time point T4 as the end point (that is, a time interval from a time point (T4-P4) to the time point T4), the torque curve 510 has a trend of decreasing to the valley and then increasing. The time interval of the period P4 includes another peak other than the peak V5, such as a peak V6 shown in FIG. 5E, and a value E6 corresponding to the peak V6 is larger than the value E5 corresponding to peak V5. As a result, the controller 121 is configured to set the torque output of motor 125 as a maximum value (that is, the value E6 of the peak V6) at the time point T4. The relevant computation of the period P4 and how to set the torque output of the motor 125 may be referred to the above description.

During the process in which the user continues to ride, a time point T5 is used as the current time for illustration, in which the time point T5 is another time point after the time point T4 of FIG. 5D. The controller 121 is configured to receive the torque signals in step S310, as shown in the torque curve 510 of FIG. 5E. In the present embodiment, the torque curve 510 has a trend of decreasing in a period P5, which is before the time point T5 with the time point T5 as the end point (that is, a time interval from a time point (T5-P5) to the time point T5). This time interval does not include any peak. As a result, the motor 125 will output power at the value of E6 for a period of time, and then start to decrease the torque output. The relevant computation of the period P5 and how to maintain the torque output of the motor 125 may be referred to the above description.

In FIG. 5F, the controller 121 does not receive any torque signal. For example, the circumstance may be when the user reaches a flat road after climbing a small slope or when the user is going downhill. As a result, the controller 121 controls the motor 125 to decrease the torque output, and stops the motor 125 at a time point T6, as shown in the torque output curve 520.

As summarized from the above embodiments shown in FIG. 4A to FIG. 4F and that shown in FIG. 5A to FIG. 5F, the controller 121 is configured to determine whether the maximum value of the torque signals within a period of time has changed in real time when the user exerts more and more pedal force according to the present disclosure. If yes, the torque output of the motor 125 is updated correspondingly to prevent the user from getting tired as riding, or avoid the problem in which the user currently needs to exert more force but the power assisted electric bicycle does not provide the necessary power assistance or the power assistance is not provided in real time (for example, after one minute). Since the length of the period changes closely with the speed, the torque signals in the data window obtained through the period length can all be adjusted corresponding to each pedaling. That is, when the user pedals effectively, the torque signals in the data window will essentially include at least one peak corresponding to the pedaling at the horizontal position. When the user reduces the pedal force or even does not pedal, the controller 121 can also control the motor 125 to gradually lower down the output, so that the user can decrease the speed smoothly and extend the gliding time and distance when riding on the power assisted electric bicycle 100. As a result, the control method according to the present disclosure can provide the user with the power assistance for riding in real time and adjust the provided auxiliary force in real time, which avoids the unpleased ridging experience in which the bike accelerates or decelerates too sudden while improving the riding safety of the user.

It is noted that in the embodiments shown in FIG. 4A to FIG. 4F and that shown in FIG. 5A to FIG. 5F, the torque output of the motor 125 controlled by the controller 121 (for example, the torques represented by the torque signal curves 410, 510) is essentially proportional to the pedal force of the user. That is to say, the motor 125 will output a corresponding torque with a one to one ratio according to the pedal force exerted by the user. This is why the torque curve 410 and the torque output curve 420 used in FIG. 4A coincide with each other, and the torque curve 510 and the torque output curve 520 in FIG. 5 coincide with each other. In some embodiments, according to different models of the power assisted electric bicycle 100, different preferences and habits of the user or different usage situations, there may be different proportion settings between the torque output of the motor 125 controlled by the controller 121 and the pedal force of the user. As a result, the front end of the torque curve 410 (that is, the torque at an earlier time point) is higher (or lower) than the rear end of the torque curve 410 (that is, the torque at a later time point), and at the same time the front end of the torque curve 510 is also higher (or lower) than the rear end of the torque curve 510 in the same proportion. Additionally, in some embodiments, when the torque sensor 123 is disposed adjacent to the left and right pedals 150, 160, the torque sensor 123 only detects and obtains the pedal force on the left and right pedals 150, 160. However, in some other embodiments, the torque sensor 123 is disposed in the transmission device 120, and the transmission device 120 is fixed to the rear wheel 130. In such an embodiment, the torque signal detected by the torque sensor 123 may include the pedal force and the output of the motor 125. Therefore, in such an embodiment, the controller 121 needs to take the combination of the different disposition and the magnitude of the detected torque signals corresponding thereto into consideration of the torque output.

The proportions between the torque output and the pedal force can be preset before the power assisted electric bicycle 100 leaves the factory. The proportions settings then can be adjusted afterwards according to usage situations or habits of the user (for example, through the detection of the controller 121 or through the inputting of the user). For example, if the user considers that the assistance of the power assisted electric bicycle 100 is too large for him/her to experience the joy of riding, the user can use an input/output device of the power assisted electric bicycle 100 (such as a dashboard disposed on the bicycle or a mobile electronic device wirelessly connected to the controller 121) to reduce the torque output of the motor 125. In addition to that, when the power assisted electric bicycle 100 detects that the user is going uphill and more power assistance from the power assisted electric bicycle 100 is needed, the controller 121 can adjust the torque output of the motor 125 proportionally according to the angle of climbing.

Figure 6:
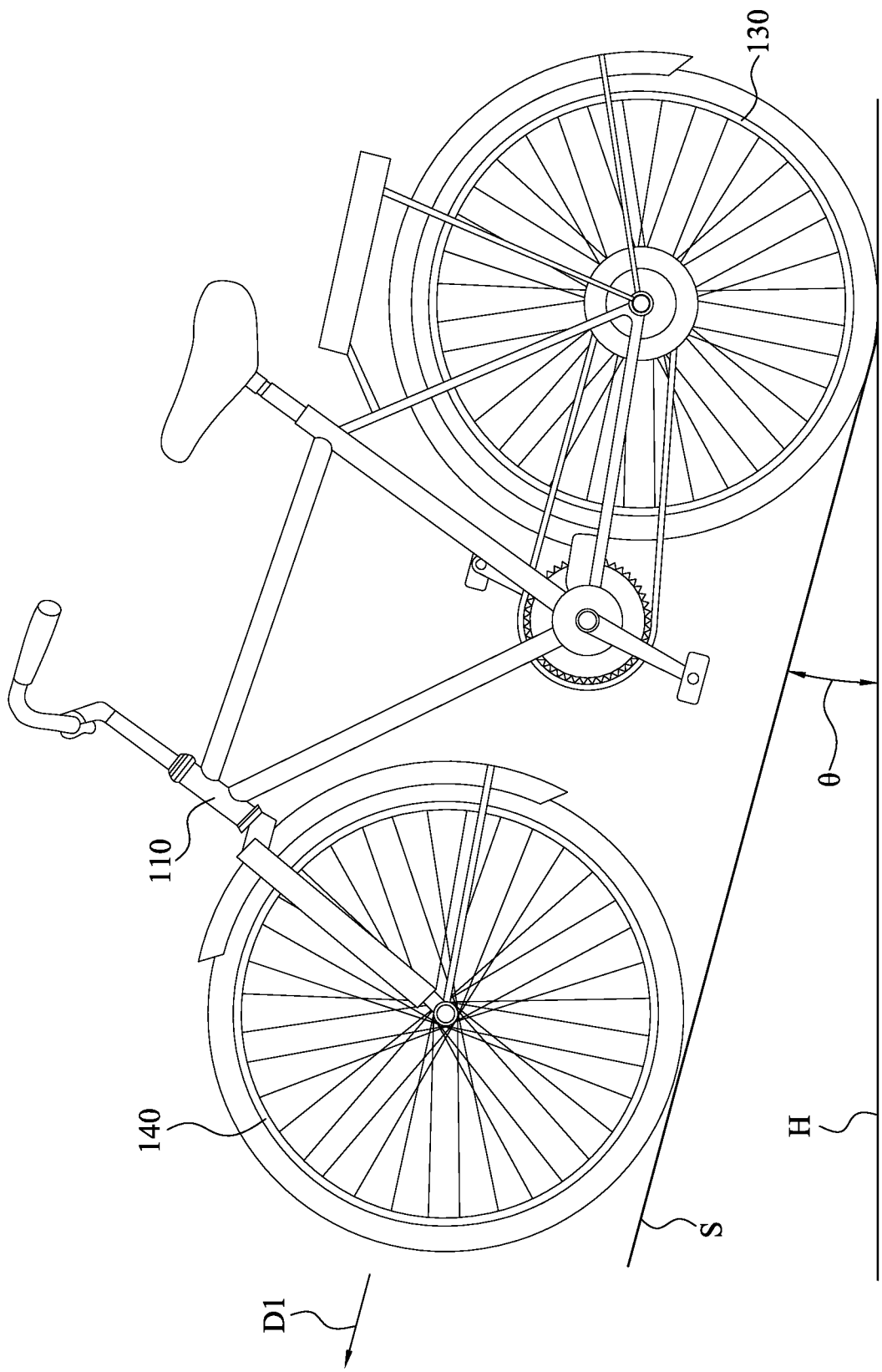
FIG. 6 depicts a schematic diagram showing environment of computing an angle according to some embodiments of the present disclosure.

Reference is made to FIG. 6. FIG. 6 depicts a schematic diagram of computing an angle θ according to some embodiments of the present disclosure. As shown in FIG. 6, the power assisted electric bicycle 100 of FIG. 1 moves forward in a traveling direction D1. In this embodiment, the power assisted electric bicycle 100 moves on a slope S, and there is an angle θ between the slope S and a horizontal plane H. Hence, there is also the angle θ between the traveling direction D1 and the horizontal plane H.

Figure 7:
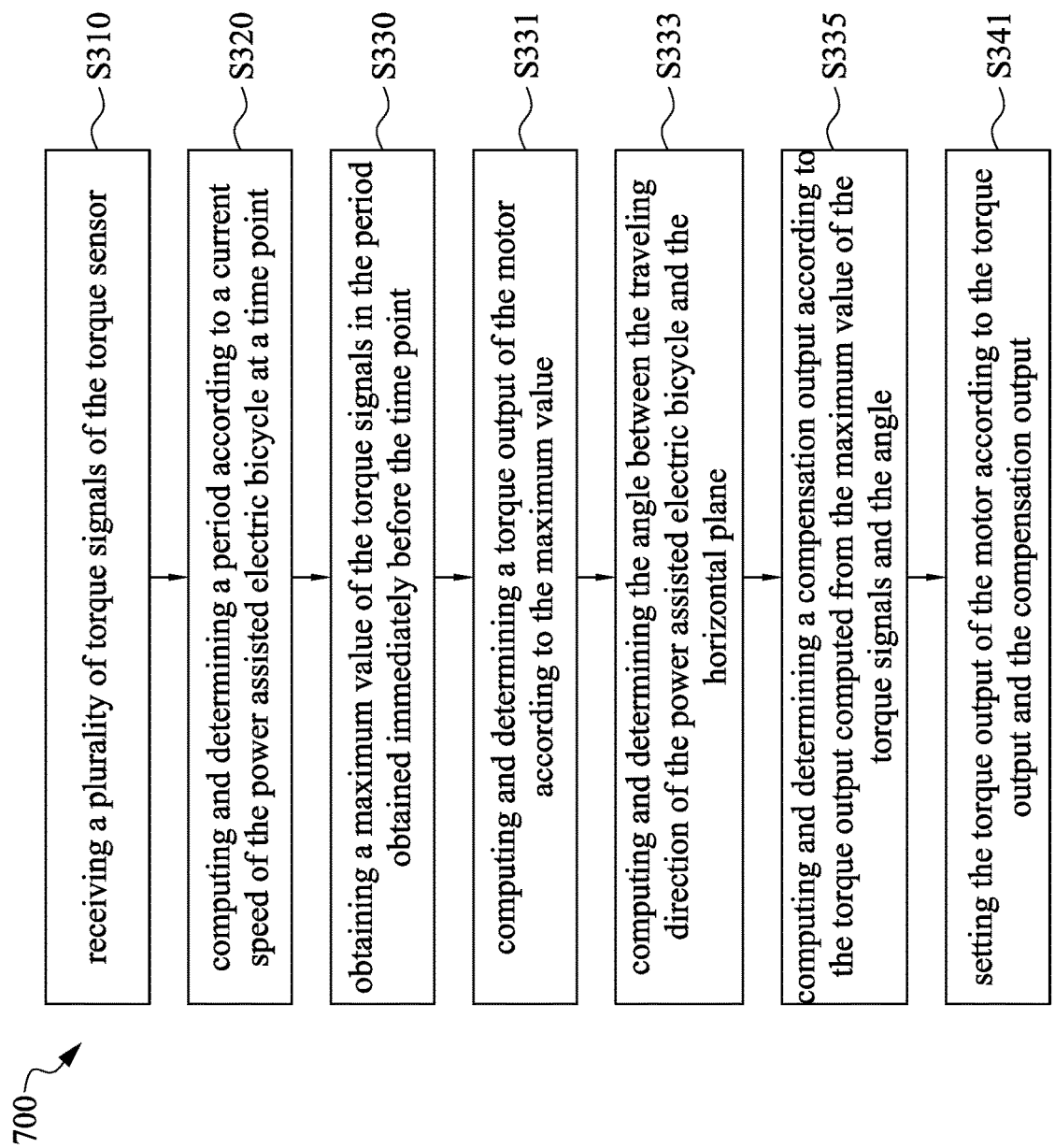
FIG. 7 depicts a flow chart of a control method according to some other embodiments of the present disclosure.

In order to explain in detail as to how the power assisted electric bicycle 100 provides auxiliary power correspondingly when moving on the slope S, reference is made to FIG. 6 and FIG. 7 together.

FIG. 7 depicts a flow chart of a control method 700 according to some other embodiments of the present disclosure. As shown in FIG. 7, since step S310 and step S320 may be referred to the description of FIG. 3, a description in this regard is not repeated here.

In step S331, the controller 121 is used to obtain a maximum value of the torque signals in the period immediately before a current time point. The controller 121 then computes and determines a torque output of the motor 125 according to the maximum value. A description for this part may be referred to the previous FIG. 4A to FIG. 4F and FIG. 5A to FIG. 5F.

In step S333, computing and determining the angle θ between the traveling direction D1 of the power assisted electric bicycle 100 and the horizontal plane H is performed by the controller 121. For example, the body 110 moves forward in the traveling direction D1, and the user, for example, rides the bicycle on the slope with the angle θ to move forward in the traveling direction D1. In some embodiments, the controller 121 is configured to compute and determine the angle θ by using equation (3):

$$\sin\theta = \left(\frac{MT + HT}{R \times W \times g}\right) - \frac{acceleration}{g} \quad \text{equation (3)}$$

Where MT is motor torque, HT is human torque, R is wheel radius, W is total weight, g is gravitational acceleration and acceleration is motor acceleration. The motor torque and human torque may be real-time information or may be data from a previous time point (for example, a previous sampling time point). The total weight is a sum of a weight of the body 110 and a weight of the user.

As shown in equation (3), the torque signal of the motor 125 and the torque signal of the pedal force (that is, the overall torque value of the bicycle) are the torque value on the slope. The product of the wheel radius, the total weight and the gravitational acceleration is the vertically downward torque value of the bicycle on the slope S. Simplify put, according to the total torque that allows the power assisted electric bicycle 100 to move forward and the load, the speed at which the power assisted electric bicycle 100 should travel currently can be known. When the actual forward speed does not match, a magnitude of an uphill angle can be computed and determined through the relationship between the torque and the load and equation (3). In one embodiment, in equation (3) if the value of the term before the minus sign is equal to the value of the term after the minus sign (that is, sin θ=0), it represents that the current angle is zero. Therefore, it can be determined that the power assisted electric bicycle 100 is ridden on a flat road.

After computing and determining the angle θ, in step S335, the controller 121 computes and determines a compensation output according to the torque output computed from the maximum value of the torque signals and the angle θ. In some embodiments, the controller 121 can appropriately dynamically increase the torque output of the motor 125 according to the angle θ and some other parameters (such as the current speed/acceleration and the state of the user). In some embodiments, the controller 121 can determine a compensation ratio according to the angle θ in a compensation lookup table. Reference is made to table 1, which is an embodiment of the compensation lookup table.

TABLE 1

Compensation lookup table

| Angle θ | Compensation Ratio |
|---|---|
| 0° | 0.5 |
| 2.9° | 0.6 |
| 5.7° | 0.7 |
| 8.5° | 0.8 |
| 11.3° | 0.9 |
| 14° | 1.0 |
| 16.7° | 1.0 |

As shown in Table 1, the compensation lookup table includes the angle θ and the corresponding compensation ratio. For example, if the angle θ in FIG. 6 is 0° (that is, riding on a flat road), the corresponding compensation ratio is 0.5, which means that the motor 125 will use 0.5 times of the torque output of the normal state as the compensation output. Generally speaking, the power assisted electric bicycle 100 thus operates with the power value of the pedaling of the user plus the compensation output of the motor 125 that is 0.5 times of the power value of the pedaling (that is, the power output is 1.5 times).

In addition, if the angle θ in FIG. 6 is 16.7°, the corresponding compensation ratio is 1.0, which means that one time of the torque output is used as the compensation output. Generally speaking, the power assisted electric bicycle 100 thus operates with the power value of the pedaling of the user plus the compensation output of the motor 125 that is one time of the power value of the pedaling (that is, the power output doubles). It is noted that the compensation lookup table shown in Table 1 is only taken as an example for illustration. In fact, different settings may be made depending on the needs, and the present disclosure is not limited to the values of the compensation ratios shown in Table 1.

In some embodiments, the controller 121 can be operated in different operation modes to control the torque output of the motor 125. For example, the operation mode may include a casual mode, a normal mode, and a racing mode. In the casual mode, it is suitable for the user, for example, to ride a bicycle on the riverside while watching the scenery. Herein, the motor 125 provides more power to allow the user to ride more easily. In the racing mode, it is suitable for the user, for example, to be in a physical competition. Herein, the motor 125 provides less power (and/or the same auxiliary force as another power assisted electric bicycle) so that the user needs to exert more pedal force for racing. The controller 121 is configured to select a compensation lookup table correspondingly according to the operation mode, and use the corresponding compensation lookup table to obtain the compensation ratio accordingly. It is noted that various compensation lookup tables corresponding to the above operation modes and the compensation lookup table used for uphill/downhill can be used together and are not mutually exclusive.

In step S341, the controller 121 sets the torque output of the motor 125 according to the torque output and the compensation output. For example, when the angle θ is 0°, 1.5 times of the torque output is used as the compensation output. Additionally, when the angle θ is 14°, 2 times of the torque output is used as the compensation output. That is to say, when the user rides on a flat road with no gradient (for example, θ=0°), the motor 125 only provides less power, which reduces the riding burden of the user. When the user rides on a flat road with a gradient (for example, θ≠0°), the torque output of the motor 125 can be controlled according to the angle θ of the gradient. The larger the angle is, the more power assistance is provided.

As a result, according to the control method 700 of the present disclosure, the torque output of the motor 125 can be appropriately adjusted during the riding according to the angle θ of the slope S. In this manner, the power assisted electric bicycle 100 can reliably provide power assistance output correspondingly when the user needs auxiliary power, and the problem in which the torque output of the motor 125 fluctuates due to the different riding gradients of the user may be avoided. For example, too much torque output is provided when the gradient is small, or insufficient power is provided when the gradient is large. Through the control method 700 according to the present disclosure, the user can ride the power assisted electric bicycle 100 with a similar pedal force no matter the bike is on a steep slope, a small slope or a flat road. In addition, there is no need to use different pedal forces for different road conditions, thus making the riding process more comfortable.

Figure 8:
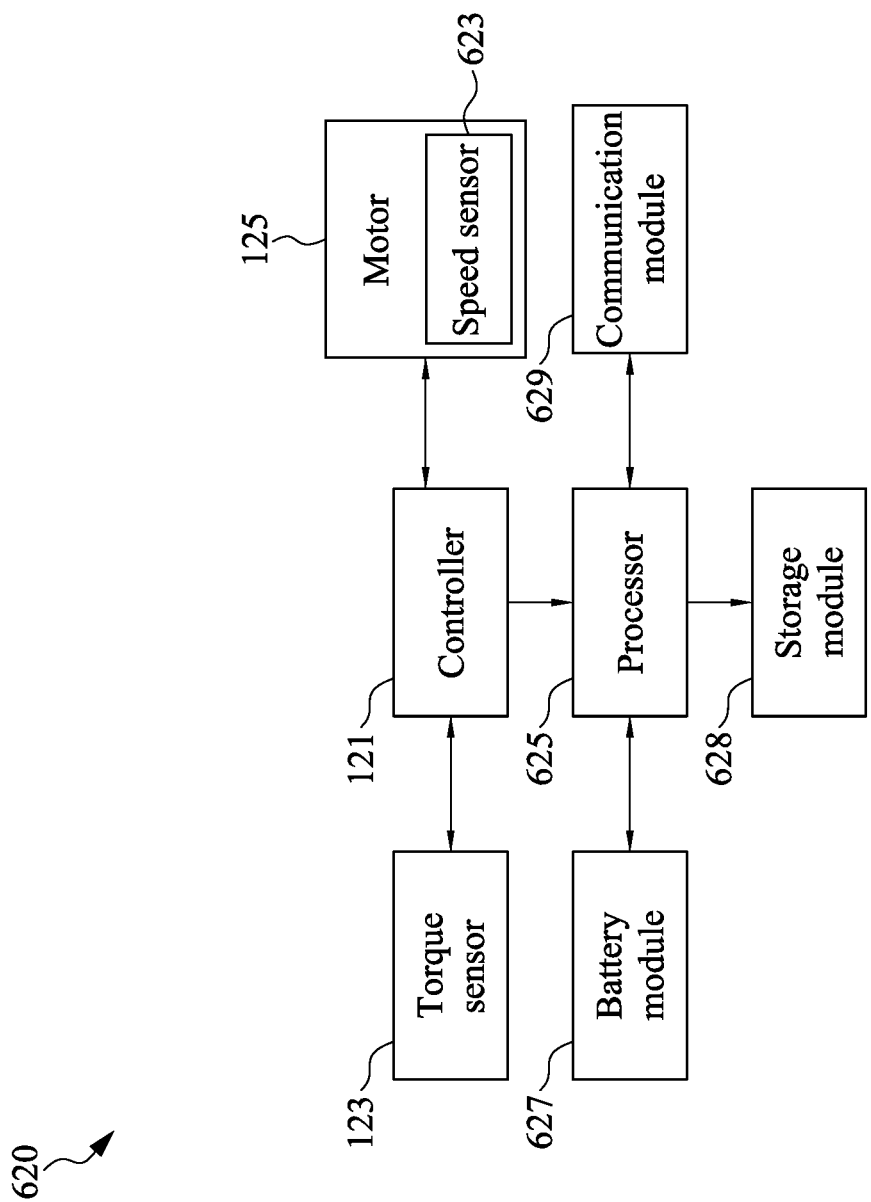
FIG. 8 depicts a functional block diagram of a transmission device according to some other embodiments of the present disclosure.

Reference is made to FIG. 8. FIG. 8 depicts a functional block diagram of a transmission device 620 according to some other embodiments of the present disclosure. As compared with the transmission device 120 of FIG. 2A, the transmission device 620 of FIG. 6 further includes a processor 625, a battery module 627, a storage module 628 and a communication module 629. Further, the motor 125 includes a speed sensor 623. The speed sensor 623 may be a position sensor or an independent speedometer, which is used for detecting the rotation signal of the motor 125 and providing the rotation signal or the sensed speed value to the controller 121, so that it can be used as one of the parameter values for the controller 121 to compute equation (3).

The battery module 627, the storage module 628 and the communication module 629 are coupled to the processor 625. The battery module 627 is configured to store electrical energy and provide electrical energy to all components of the transmission device 620. The storage module 628 is configured to store, for example, program codes, so that the processor 625 can execute application programs to exchange data with application programs installed on an electronic device (not shown in the figure) through the communication module 629. For example, an application program is installed on the electronic device (not shown in the figure). Through inputting information, such as height, weight, etc., on a user interface of the application program by the user, the processor 625 can obtain this information and send it to the controller 121, so that it can be used as one of the parameter values for the controller 121 to compute equation (2). In some embodiments, the processor 625 can also be directly or indirectly connect to a remote server through the communication module 629 to obtain the above user-related information. The processor 625 may be an electronic control unit (ECU) or a motor control unit (MCU).

In summary, the present disclosure provides a power assisted electric bicycle, a control method and a transmission device. The computed period according to the pedaling of the user can match the torque output caused by the current force exerted by the user. By combining the pedaling of the user with the power output of the motor, the overall power value is dynamically modified to achieve the effect that the riding speed experienced by the user is in line with the pedal force experience.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

We claim:

1. A power assisted electric bicycle, comprising:
a body;
a wheel disposed on the body;
a torque sensor configured to output a plurality of torque signals corresponding to a pedal force;
a motor configured to drive the wheel; and
a controller coupled to the torque sensor and the motor, wherein the controller is configured to:
receive the torque signals from the torque sensor, wherein the torque signals correspond to the pedal force greater than zero;
compute and determine a first period of time according to a speed of the power assisted electric bicycle at a first time point;
obtain a first maximum value of the torque signals in the first period of time before the first time point; and
set a first torque output of the motor according to the first maximum value corresponding to the torque signals, wherein the first torque output is proportional to the first maximum value.

2. The power assisted electric bicycle of claim 1, wherein the controller is further configured to:
compute and determine a second period according to the speed of the power assisted electric bicycle at a second time point, wherein the second time point is later than the first time point;
obtain a second maximum value of the torque signals in the second period before the second time point; and
set a second torque output of the motor according to the second maximum value if it is determined that the second maximum value is different from the first maximum value.

3. The power assisted electric bicycle of claim 2, wherein:
the motor is disposed in the wheel; and
the controller is configured to compute and determine the speed of the power assisted electric bicycle at the first time point according to a rotation speed of the motor at the first time point.

4. The power assisted electric bicycle of claim 1, wherein the wheel, which is driven by the pedal force and the motor, moves in a traveling direction, and the controller is further configured to:
compute an angle between the traveling direction and a horizontal plane;
compute a first compensation output according to the angle and the first torque output; and
set a torque output of the motor according to the first torque output and the first compensation output.

5. The power assisted electric bicycle of claim 4, wherein the controller is further configured to:
read a compensation ratio in a compensation lookup table according to the angle; and
compute the first compensation output by using the compensation ratio and the torque output.

6. The power assisted electric bicycle of claim 1, further comprising a transmission device disposed on the wheel, the transmission device comprising the torque sensor, the motor, and the controller; and
wherein the torque sensor is disposed adjacent to the wheel, and the torque sensor outputs the torque signals according to a gear ratio of a pedaling input shaft sprocket on the body to a wheel gear and the pedal force measured at the pedaling input shaft sprocket.

7. The power assisted electric bicycle of claim 1, further comprising a transmission device disposed on the wheel, the transmission device comprising the motor and the controller; and
wherein the torque sensor is disposed adjacent to a pedal of the body, and the torque sensor outputs the torque signals through the pedal force measured at the pedal.

8. A control method configured for a power assisted electric bicycle, wherein the power assisted electric bicycle comprises a body, a wheel disposed on the body, a torque sensor, a motor configured to drive the wheel and a controller, wherein the torque sensor is configured to output a plurality of torque signals corresponding to a pedal force, the motor is configured to drive the wheel, wherein the control method comprises:
receiving the torque signals of the torque sensor, wherein the torque signals correspond to the pedal force greater than zero;

computing and determining a first period of time according to a speed of the power assisted electric bicycle at a first time point;
obtaining a first maximum value of the torque signals in the first period of time before the first time point; and
setting a first torque output of the motor according to the first maximum value corresponding to the torque signals, wherein the first torque output is proportional to the first maximum value.

9. The control method of claim 8, further comprising
computing and determining a second period according to the speed of the power assisted electric bicycle at a second time point, wherein the second time point is later than the first time point;
obtaining a second maximum value of the torque signals in the second period before the second time point; and
setting a second torque output of the motor according to the second maximum value if it is determined that the second maximum value is different from the first maximum value.

10. The control method of claim 9, wherein the motor is disposed on the wheel, the control method further comprises:
computing the speed of the power assisted electric bicycle at the first time point according to a rotation speed of the motor at the first time point.

11. The control method of claim 8, wherein a length of the first period of time is inversely proportional to the speed.

12. The control method of claim 8, wherein the wheel moves in a traveling direction through the pedal force and driving of the motor, and the control method further comprises:
computing an angle between the traveling direction and a horizontal plane;
computing a first compensation output according to the angle and the first torque output; and
setting a torque output of the motor according to the first torque output and the first compensation output.

13. The control method of claim 12, further comprising:
reading a compensation ratio in a compensation lookup table according to the angle; and
computing the first compensation output by using the compensation ratio and the torque output.

14. The control method of claim 8, wherein the torque sensor outputs the torque signals according to a gear ratio of a pedaling input shaft sprocket on the body to a wheel gear and the pedal force measured at the pedaling input shaft sprocket.

15. The control method of claim 8, wherein the torque sensor outputs the torque signals by measuring the pedal force at a pedal of the body.

16. A transmission device configured to provide a power output of a power assisted electric bicycle, wherein the transmission device comprises:
a torque sensor configured to output a plurality of torque signals corresponding to a pedal force;
a motor configured to drive a wheel; and
a controller coupled to the torque sensor and the motor, wherein the controller is configured to:
receive the torque signals from the torque sensor, wherein the torque signals correspond to the pedal force greater than zero;
compute and determine a first period of time according to a speed of the power assisted electric bicycle at a first time point;
obtain a first maximum value of the torque signals in the first period of time before the first time point; and
set a first torque output of the motor according to the first maximum value corresponding to the torque signals.

17. The transmission device of claim 16, wherein the controller is further configured to:
compute and determine a second period according to the speed of the power assisted electric bicycle at a second time point, wherein the second time point is later than the first time point;
obtain a second maximum value of the torque signals in the second period before the second time point; and
set a second torque output of the motor according to the second maximum value if it is determined that the second maximum value is different from the first maximum value.

18. The transmission device of claim 17, wherein the motor is disposed on the wheel, and the controller is further configured to:
compute the speed of the power assisted electric bicycle at the first time point according to a rotation speed of the motor at the first time point.

19. The transmission device of claim 17, wherein the controller is further configured to:
compute an angle between a traveling direction and a horizontal plane;
compute a first compensation output according to the angle and the first torque output; and
set a torque output of the motor according to the first torque output and the first compensation output.

20. The transmission device of claim 19, wherein the controller is further configured to:
read a compensation ratio in a compensation lookup table according to the angle; and
compute the first compensation output by using the compensation ratio and the torque output.

* * * * *